US006415652B1

(12) United States Patent
Carrell et al.

(10) Patent No.: US 6,415,652 B1
(45) Date of Patent: Jul. 9, 2002

(54) METHOD AND APPARATUS FOR DETERMINING AN OIL GRADE OF AN ACTUATING FLUID

(75) Inventors: Darwin R. Carrell, Edwards; Larry E. Kendrick; Gregory J. Speckhart, both of Peoria; Michael S. Lukich, Chillicothe, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/465,571

(22) Filed: Dec. 17, 1999

(51) Int. Cl.[7] ............................................ G01N 11/08
(52) U.S. Cl. ..................................... 73/54.02; 123/446
(58) Field of Search ............................ 73/54.01, 54.02, 73/54.23, 54.42, 54.43; 123/446

(56) References Cited

U.S. PATENT DOCUMENTS

| | | | | |
|---|---|---|---|---|
| 5,024,200 A | | 6/1991 | Free et al. | 123/501 |
| 5,181,494 A | | 1/1993 | Ausman et al. | 123/446 |
| 5,411,003 A | | 5/1995 | Eberhard et al. | 123/502 |
| 5,423,302 A | | 6/1995 | Glassey | 123/446 |
| 5,529,044 A | | 6/1996 | Barnes et al. | 123/496 |
| 5,826,561 A | | 10/1998 | Mack et al. | 123/446 |
| 5,896,841 A | * | 4/1999 | Nemoto et al. | 123/446 |
| 6,216,528 B1 | * | 4/2001 | Carrell et al. | 73/54.01 |

FOREIGN PATENT DOCUMENTS

| | | |
|---|---|---|
| WO | WO00/36394 | 6/2000 |

* cited by examiner

*Primary Examiner*—Henry C. Yuen
*Assistant Examiner*—Arnold Castro
(74) *Attorney, Agent, or Firm*—J. W. Burrows

(57) ABSTRACT

The present invention provides a method and apparatus for determining the oil grade of an actuating fluid in a fuel system. The method includes the steps of determining an actuating fluid temperature, a pump speed, and a peak pressure or a timing event of the actuating fluid, and responsively determining the oil grade of the actuating fluid.

14 Claims, 4 Drawing Sheets

METHOD AND APPARATUS FOR DETERMINING AN OIL GRADE OF AN ACTUATING FLUID

DESCRIPTION

1. Technical Field

This invention relates generally to a fuel system, and more particularly, to a method and apparatus for determining an oil grade of an actuating fluid located within a fuel system.

2. Background Art

In a fuel system having hydraulically-actuated electronically controlled unit injectors (HEUI), high pressure hydraulic actuating fluid flows into a chamber, located within the injector, and pushes down on a plunger which pushes fuel out from a plunger cavity, and out the injector through a nozzle. A solenoid, located within the injector, controls when the high pressure actuating fluid is exposed to the plunger by moving a poppet valve. The amount of fuel injected is controlled by adjusting the duration the solenoid is on.

Engine lubricating oils can be utilized as the hydraulic fluids. There are different types of engine lubricating oils having a variety of grades. The grades range from higher grades, such as 15W40 engine oil, to lower grades, such as 0W20 engine oil. The higher the grade is, the more viscous the oil is.

The viscosity of the actuating fluid effects both the amount of fuel delivered by the injector, and when the delivery process begins. For example, two similar engines, each utilizing a different grade of engine oil, but operating in the same temperature will have different hydraulic fluid viscosities. For example, a first engine utilizing the higher grade engine oil for the actuating fluid is thicker (more viscous) than a second engine utilizing the lower grade engine oil for the actuating fluid. Therefore, on the first engine, when an electrical signal is delivered to a solenoid, commanding the solenoid to deliver actuating fluid to the injector, the fluid flows at a slower rate into the chamber to push against the plunger, than would occur on the second engine. With the actuating fluid moving at a slower rate there is an increased delay before the injector begins delivering fuel. Furthermore, the rate that fuel is delivered depends on the pressure on the plunger. As fuel is delivered the pressure on the plunger will drop unless additional oil is supplied. The first engine is using a more viscous oil and thus the oil will flow more slowly than will be the case for the second engine. This results in a lower actuating pressure and thus lower fuel delivery rate for the first engine. Hence, with the first engine utilizing the high grade engine oil as compared to the second engine utilizing the low grade engine oil, less fuel is delivered by the injectors and the fuel is delivered later in the crank cycle. Under these conditions, unless the oil grade being utilized is determined, overall engine performance is adversely effected, resulting in incomplete combustion, low power, white smoke, etc.

The viscosity of the actuating fluid is a function of the oil grade, the amount the actuating fluid is sheared as the fluid flows through the hydraulic circuit, and the temperature of the actuating fluid. In an operating engine, neither the oil grade, nor the temperature is fixed. For example, a higher grade engine oil or a lower grade engine oil may be used. Also the fuel system operates over a wide range of temperatures, e.g., −50 degrees Fahrenheit through 250 degrees Fahrenheit. The actuating fluid has more viscosity in colder temperatures.

The reduction in fuel delivery and fuel delivery delay increase as the viscosity of the actuating fluid increases. If the different types of oil grades are not accounted for, the fuel delivery and timing may be incorrect making it difficult to start and run the engine especially at high viscosities encountered at cold temperatures. If the fuel delivery is too small the engine may not start or be underpowered. If the fuel delivery is too large the engine structural capabilities may be exceeded, or excessive smoke may be produced. Misfire may occur due to fuel delivery at incorrect (late) ignition timings.

The present invention is directed to overcoming one or more of the problems identified above.

DISCLOSURE OF THE INVENTION

In one aspect of the present invention, a method for determining an oil grade of an actuating fluid located within a fuel system is disclosed. The method includes the steps of determining a temperature of the actuating fluid, a pump speed, a timing event associated with a peak pressure of the actuating fluid, and responsively determining an oil grade of the actuating fluid.

In yet another aspect of the present invention, a method for determining an oil grade of an actuating fluid located within a fuel system is disclosed. The fuel system includes a variable displacement pump having a maximum and minimum displacement position. The method includes the steps of determining a temperature of the actuating fluid, a pump speed, a peak pressure, a rise time of the peak pressure in response to the pump moving from a maximum displacement position to a minimum displacement position, and responsively determining an oil grade of the actuating fluid.

In yet another aspect of the present invention, a method for determining an oil grade of an actuating fluid located within a fuel system is disclosed. The fuel system includes a leakage orifice. The method includes the steps of determining a temperature of the actuating fluid, a pump speed, a peak pressure, a decay time of the peak pressure as a function of the peak pressure and the leakage orifice, and responsively determining an oil grade of the actuating fluid.

In yet another aspect of the present invention, a method for determining an oil grade of an actuating fluid located within a fuel system is disclosed. The method includes the steps of determining a temperature of the actuating fluid, a pump speed, a maximum peak pressure of the actuating fluid, and responsively determining an oil grade of the actuating fluid.

In yet another aspect of the present invention, an apparatus for determining a viscosity range of an actuating fluid located within a fuel system is disclosed. The apparatus includes a pressure sensor adapted to sense a pressure of the actuating fluid, a temperature sensor adapted to sense a temperature of the actuating fluid, and a controller adapted to determine an oil grade of said actuating fluid in response to the pressure and temperature.

BEST MODE FOR CARRYING OUT THE INVENTION

Figure 1:
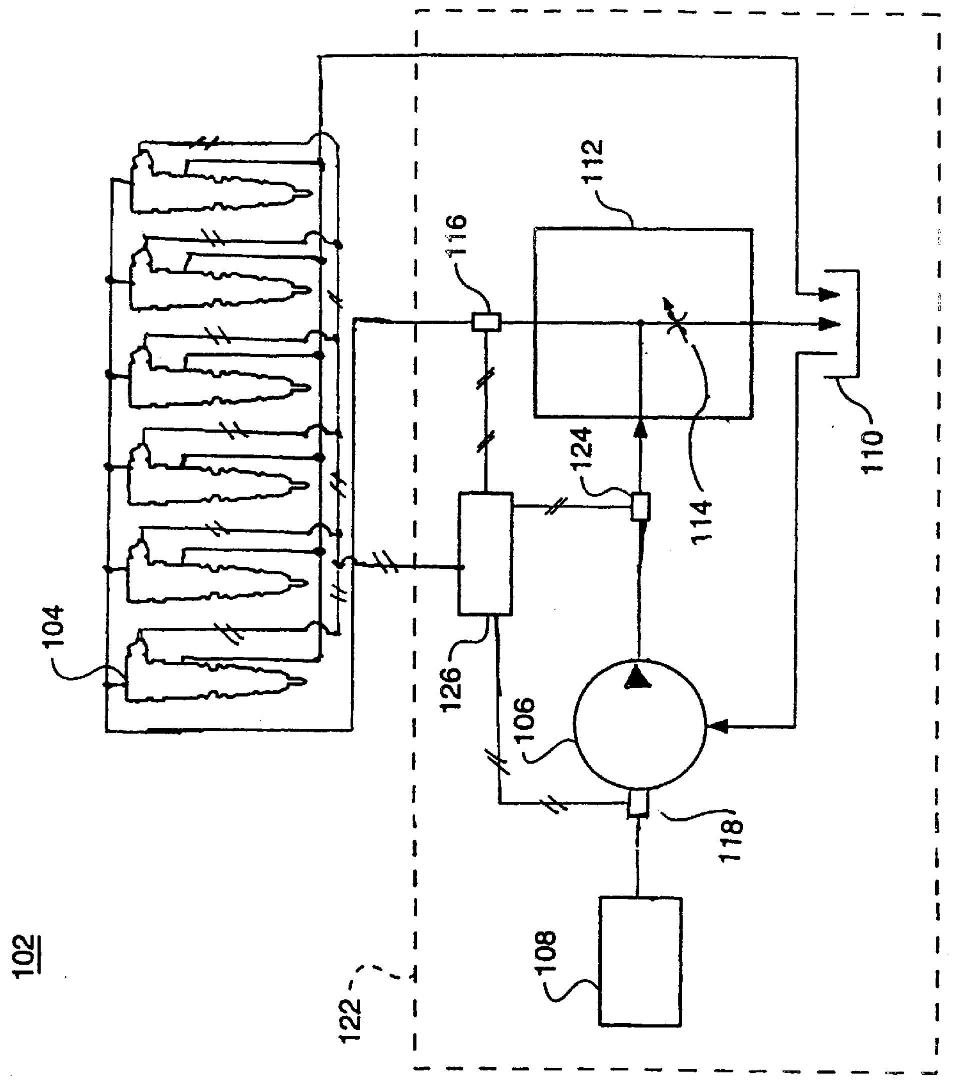
FIG. 1 is a high level diagram of one embodiment of a fuel system.

The present invention provides an apparatus and method for determining a viscosity range of actuating fluid. FIG. 1 is an illustration of one embodiment of a fuel system 102 of an engine. The fuel system 102 includes at least one hydraulically-actuated electronically-controlled injector (HEUI) 104 for each combustion chamber or cylinder (not shown) of the fuel system 102. The fuel system 102 also includes a circuit 122 for supplying actuating fluid to each injector 104. In one embodiment the circuit 122 includes a pump 106, driven by an internal combustion engine 108. In the preferred embodiment the pump 106 is a variable displacement pump having a maximum displacement position and a minimum displacement position. Alternatively, a fixed displacement pump may be used without deviating from the embodiment of the invention. The output of the pump 106 is connected to each fuel injector 104 and also to a fluid sump (or tank) 110. The fluid sump 110 is also attached, through a return line, back to the pump 106. Each injector 104 is also connected to the fluid sump 110 in order to return the actuating fluid to the sump 110.

The circuit 122 includes a pressure sensor 116. The pressure sensor 116, is typically located between a pressure control valve 112, and the injectors 104. The pressure sensor 116 senses the pressure of the actuating fluid and responsively generates a pressure signal.

In addition, a sensor for determining the speed of the pump is included in the circuit 122. In one embodiment a pump speed sensor 118, located at the input of the pump 106, may be used to sense the speed of the pump 106, and responsively generate a flow signal based on the sensed pump speed. Alternatively, an engine speed sensor (not shown), may by be used to sense the speed of the engine 108, and the pump speed signal may be responsively generated from the engine speed signal based on the speed of the engine 108.

The circuit 122 includes the temperature sensor 124. The temperature sensor 124 senses the temperature of the actuating fluid, and responsively generates a fluid temperature signal. In the preferred embodiment the actuating fluid is petroleum based oil. However, the fluid may be a synthetic oil.

The circuit 122 includes an electronic controller 126. The electronic controller 126 receives the pressure signal, the temperature signal, and the pump speed signal and responsively determines a fluid flow.

Figure 2:
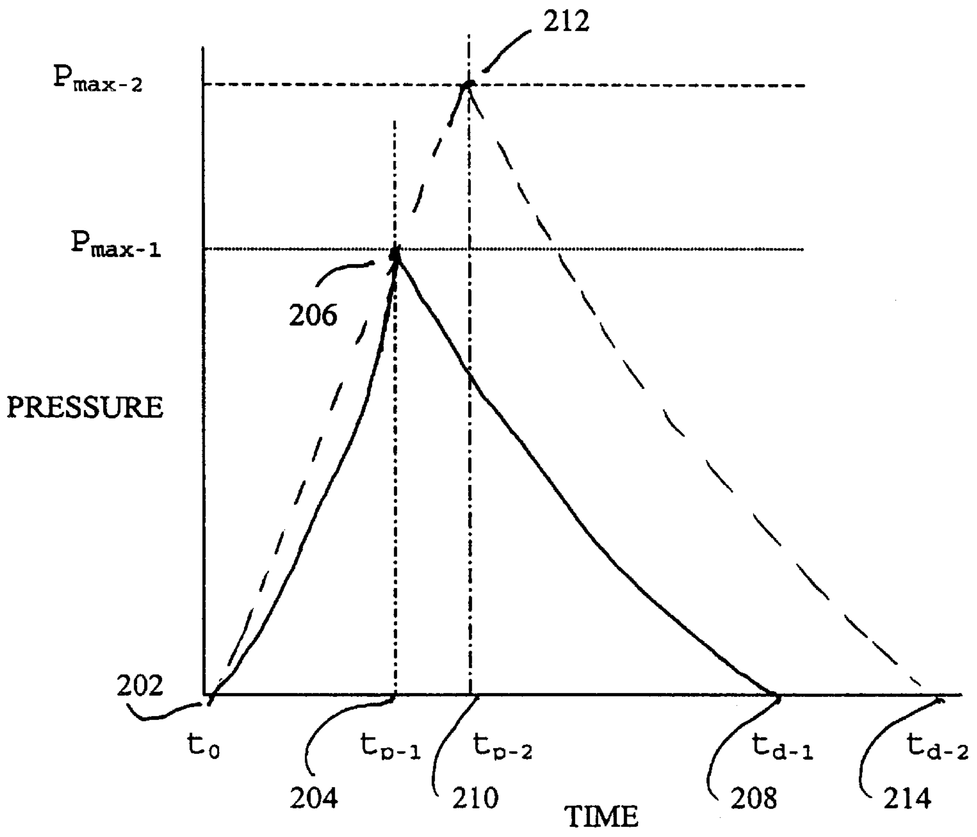
FIG. 2 is an example graph of a peak pressure of the actuating fluid.

FIG. 2 is a graph of a peak pressure of the actuating fluid. The pressure in the hydraulic circuit 122 is as shown by time $t_0$ 202, when the engine 108 is initially rotated during engine cranking and the pump 106 is at full displacement. During the cranking of the engine 108, the solenoids associated with the fuel injectors, are not activated. At this point the fuel injectors 104 are inactive. With the injectors 104 not firing, and the actuating fluid not flowing through the injectors 104, the pump displacement is moved toward minimum as the pressure rapidly rises, as shown at time $t_{p\text{-}1}$ 204, and reach a peak pressure as shown by $P_{max\text{-}1}$ 206. The amount of actuating fluid pumped is a function of the displacement and the pump 106 speed of rotation.

During cranking, a higher viscosity actuating fluid will result in the pump moving more slowly from maximum displacement to minimum displacement, as shown at time $t_{p\text{-}2}$ 210. This causes higher fluid flow and in turn high fluid pressure, as shown by $P_{max\text{-}2}$ 212. In addition, the time to reach peak pressure will be longer for the more viscous actuating fluid. The peak pressure and the time to reach peak pressure are functions of pump speed.

The injection actuation circuit will have some leakage through the orifice 114, which produces a pressure decay as shown by time $t_{d\text{-}1}$ 208, and as shown by $t_{d\text{-}2}$ 214 in the example of a actuating fluid with a higher viscosity. The pressure decay will vary with the different viscosities of different oil grades and is a function of the pressure and the size of the orifice 114.

The present invention includes a method for determining an oil grade of an actuating fluid located within a fuel system 122. The method includes the steps of determining a temperature of the actuating fluid, a pump speed, a peak pressure of the actuating fluid, a timing event associated with the peak pressure, and responsively determining an oil grade of the actuating fluid.

Figure 3:
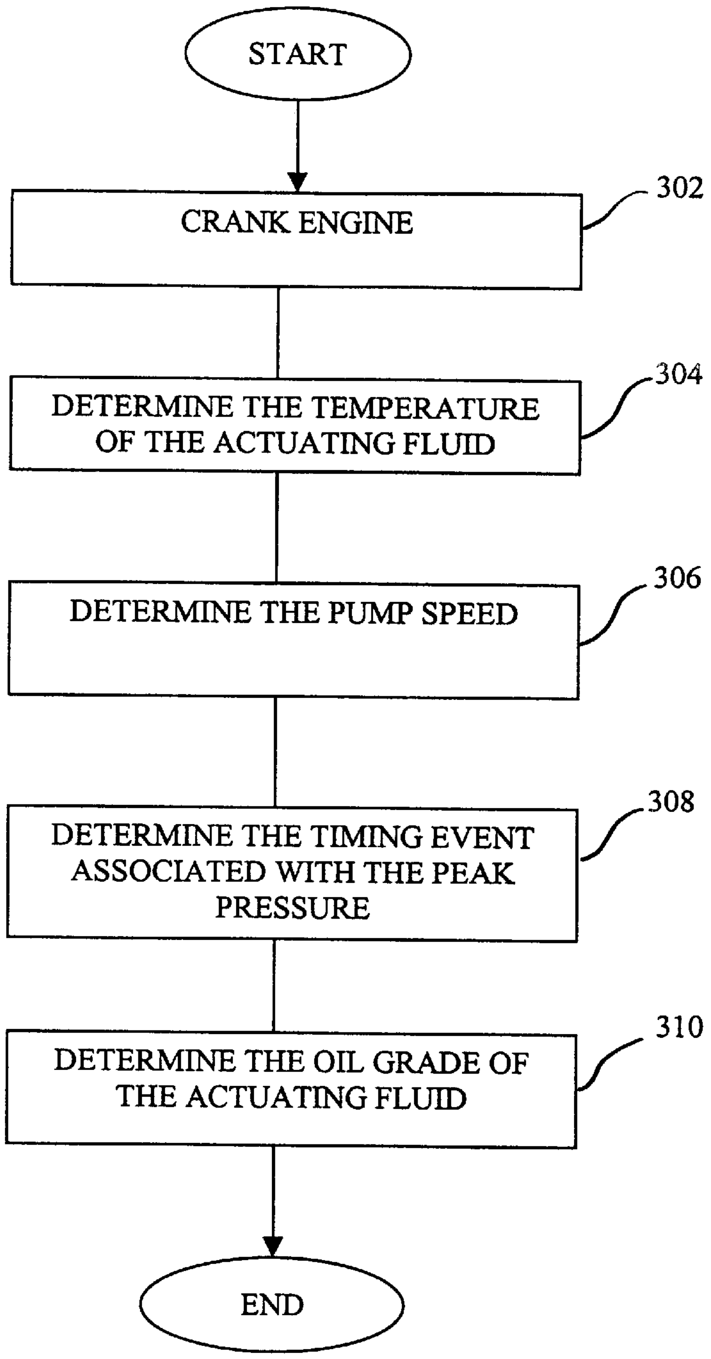
FIG. 3 is an illustration of the method for determining an oil grade of an actuating fluid; and, FIG. 4 is an illustration of an additional embodiment of the method for determining an oil grade of an actuating fluid utilizing a peak pressure value.

FIG. 3 illustrates a flow diagram of the method of the present invention. In a first control block 302 the engine 108 is cranked, whereby the engine 108 is initially rotated and the pump 106 is at maximum displacement.

In a second control block 304 the temperature of the fluid is sensed by the temperature sensor 124, and a temperature signal is delivered to the electronic controller 126.

In a third control block 306 the pump speed is determined by a pump speed sensor 118, and a pump speed signal is delivered to the electronic controller 126. Alternatively, an engine speed sensor (not shown), may by be used to sense the speed of the engine 108, and deliver the engine speed signal to the electronic controller 126 were a pump speed signal is determined utilizing the engine speed signal.

In a fourth control block 308 a timing event associated with a peak pressure is determined. One form of the timing event is how long it takes for the pressure in the hydraulic circuit 122 to rise from the initial value, as shown at time $t_0$ 202 where the pump is at maximum displacement, to the $P_{max\text{-}1}$ 206 value, as shown at $t_{p\text{-}1}$ 204 when the pump is at minimum displacement. Alternatively, the timing event may also be determined by the rate of decay of the pressure in the hydraulic circuit 122 as shown from time $t_{p\text{-}1}$ 204 as the pressure decays towards the time shown at $t_{d\text{-}1}$ 208. The value for the timing event is delivered to the electronic controller 126.

In a fifth control block 312 the oil grade of the actuating fluid is determined as a function of the actuating fluid temperature, and the timing event associated with the peak pressure. To determine the oil grade, the actual timing event is compared to values in a timing event map or table. The timing event map contains the data for a plurality of timing events at a range of temperatures and pump speeds for various engine lubricating oils.

Table 1, as shown below, illustrates the data collected for one lubricating oil and the timing event associated with attaining the peak pressure. The time required to reach peak pressure is recorded as a function of pump speed and actuating fluid temperature.

TABLE 1

| | $Temp_1$ | $Temp_2$ | $Temp_3$ | . . . | $Temp_n$ |
|---|---|---|---|---|---|
| Pump $RPM_1$ | $t_{11}$ | $t_{12}$ | $t_{13}$ | | $t_{1n}$ |
| Pump $RPM_2$ | $t_{21}$ | $t_{22}$ | $t_{23}$ | | $t_{2n}$ |
| Pump $RPM_3$ | $t_{31}$ | $t_{32}$ | $t_{33}$ | | $t_{3n}$ |
| . | | | | | |
| . | | | | | |
| . | | | | | |
| Pump $RPM_n$ | $t_{n1}$ | $t_{n2}$ | $t_{n3}$ | | $t_{nn}$ |

This process is repeated for each lubricating oil of interest. To determine the oil grade in a particular case, the pump speed (RPM), actuating fluid temperature, and time to attain peak pressure are determined. The times corresponding to the determined temperature and pump speed is compared to the values in the timing event table or map to obtain the oil grade associated with that time. One timing event table or map may contain a range of oil grades for each comparison, where the oil grade is the one with the closest comparison. Alternatively, a plurality of timing event tables or maps, each depicting one oil grade, may be compared to the determined values, where the oil grade is the one with the closest comparison.

The injection actuation circuit will have some leakage through the orifice 114 which produces a pressure decay. The pressure decay is a function of the peak pressure and the actuating fluid leakage out the orifice 114. An alternative timing event, associated with the peak pressure, is the rate of decay of the pressure in the hydraulic circuit 122 of $P_{max\text{-}1}$ 206 as shown at time $t_{p\text{-}1}$ 204 as the pressure decays towards the time shown at $t_{d\text{-}1}$ 208.

Table 2, illustrates the data collected for one lubricating oil and the timing event based on the rate of decay. The rate of decay is recorded as a function of the pressure and actuating fluid temperature.

TABLE 2

| | $Temp_1$ | $Temp_2$ | $Temp_3$ | . . . | $Temp_n$ |
|---|---|---|---|---|---|
| $P_1$ | $R_{11}$ | $R_{12}$ | $R_{13}$ | | $R_{1n}$ |
| $P_2$ | $R_{21}$ | $R_{22}$ | $R_{23}$ | | $R_{2n}$ |
| $P_3$ | $R_{31}$ | $R_{32}$ | $R_{33}$ | | $R_{3n}$ |
| . | | | | | |
| . | | | | | |
| . | | | | | |
| $P_n$ | $R_{n1}$ | $R_{n2}$ | $R_{n3}$ | | $R_{nn}$ |

The process is repeated for each oil grade. To determine the oil grade, the pressure, the rate of decay, and the actuating fluid temperature are determined. As described above for Table 1, the determined values are compared to values in a timing event map or table. One map or table having a range of oil grades may be used for the comparison. Alternatively, a plurality of maps or tables having data on each oil grade may be used for the comparison.

Figure 4:
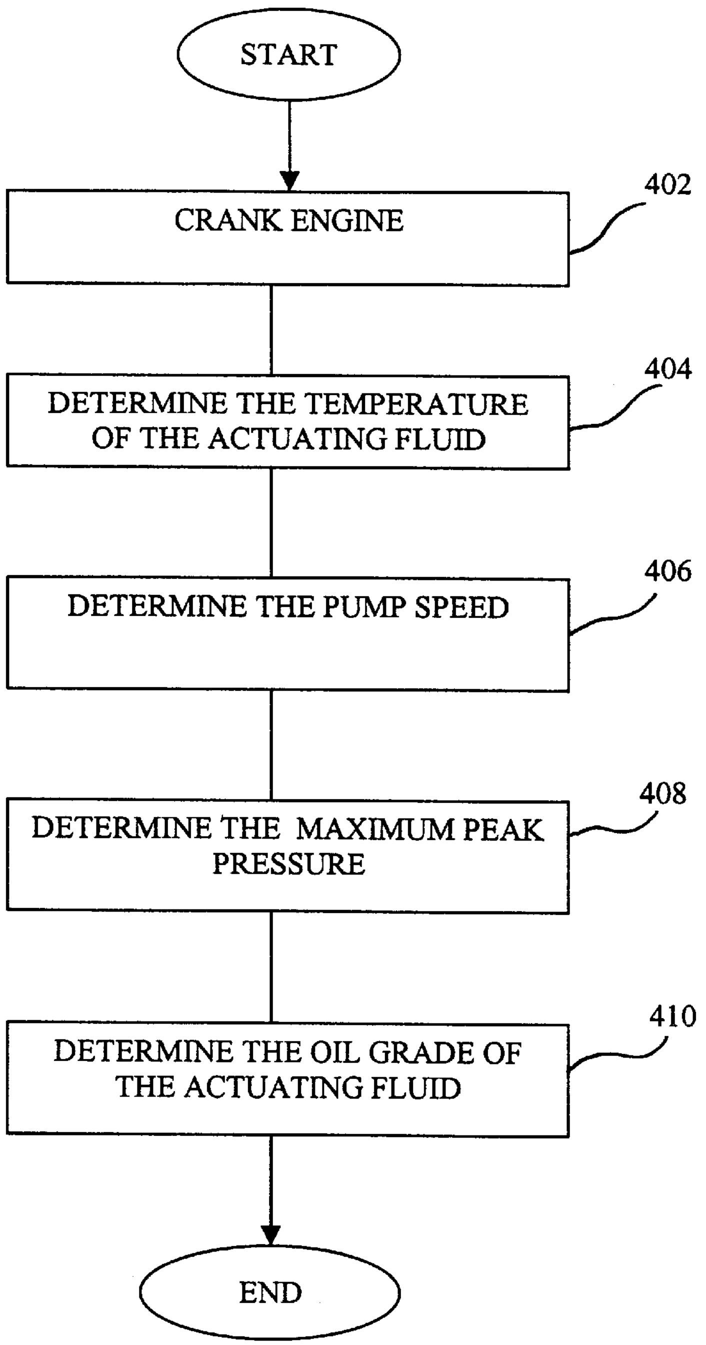

FIG. 4 is a flow diagram illustrating a method of an embodiment of the present invention. As defined for FIG. 3, the first three control blocks of FIG. 4 are the same method steps.

In a first control block 402 the engine 108 is cranked rotating the engine 108 putting the pump 106 at maximum displacement. In a second control block 404, a temperature sensor 124 senses the temperature of the actuating fluid, and delivers a temperature signal to the electronic controller 126. In a third control block 406, a the pump speed is determined by a pump speed sensor 118. Alternatively, the pump speed may be derived from an engine speed sensor (not shown). A pump speed signal is delivered to the electronic controller 118.

In a fourth control block 408 the actuating fluid maximum peak pressure is determined during cranking when the pump 106 has moved from maximum displacement to minimum displacement. The amount of actuating fluid pumped is a function of the displacement and the pump 106 speed of rotation. The value of the maximum peak pressure will be determined by the amount of actuating fluid pumped prior to the pump 106 achieving minimum displacement.

In a fifth control block 312 the oil grade of the actuating fluid is determined based on the value of the maximum peak pressure as a function of the pump speed and the actuating fluid temperature. To determine the oil grade, the maximum peak pressure is compared to values in a peak pressure map or table. The peak pressure map contains the data for a plurality of maximum peak pressures at a range of temperatures and pump speeds for various engine lubricating oils.

Table 3, as shown below, illustrates the data collected for one lubricating oil. The maximum peak pressure is recorded as a function of pump speed and fluid temperature. The process is repeated for each oil grade.

TABLE 3

| | $Temp_1$ | $Temp_2$ | $Temp_3$ | . . . | $Temp_n$ |
|---|---|---|---|---|---|
| Pump $RPM_1$ | $P_{max\text{-}11}$ | $P_{max\text{-}12}$ | $P_{max\text{-}13}$ | | $P_{max\text{-}1n}$ |
| Pump $RPM_2$ | $P_{max\text{-}21}$ | $P_{max\text{-}22}$ | $P_{max\text{-}23}$ | | $P_{max\text{-}2n}$ |
| Pump $RPM_3$ | $P_{max\ 31}$ | $P_{max\text{-}32}$ | $P_{max\text{-}33}$ | | $P_{max\text{-}3n}$ |
| . | | | | | |
| . | | | | | |
| . | | | | | |
| Pump $RPM_n$ | $P_{max\text{-}n1}$ | $P_{max\text{-}n2}$ | $P_{max\text{-}n3}$ | | $P_{max\text{-}nn}$ |

For each oil grade in a particular case, the maximum peak pressure, fluid temperature, and pump speed are determined. The maximum peak pressure corresponding to the determined fluid temperature and pump speed, is compared to the values in the peak pressure table or map, thereby, obtaining the oil grade associated with the maximum peak pressure. One peak pressure table or map may contain a range of oil grades for each comparison, having the oil grade being the one with the closest comparison. Alternatively, a plurality of peak pressure tables or maps, each depicting one oil grade, may be compared to the determined values, where the oil grade is the one with the closest comparison.

The predetermined maps or tables of different oil grades as a function of actuating fluids at different fluid temperatures, peak pressures, timing events, and pump speeds utilizing empirical analysis, simulation and testing, are stored in the electronic controller 126.

Maps for all the potential oil grades that can be used in the fuel system may be determined in a similar manner. During the operation of the present invention, the controller 126 receives the sensed temperature signals, pump speed signals, and pressure signals. The fluid temperature, and the pump speeds or fluid pressures, are used to determine the oil grade most closely resembling the viscosity characteristics of the actuating fluid. The map closest to the measured parameters indicates the oil grade the actuating fluid most closely resembles. The map may be implemented as a multi-variable look up table, providing oil grade as a function of the temperature, and the timing event or peak pressure of the actuating fluid. Therefore, the oil grade may be determined based on the temperature of the actuating fluid, and the pump speed or the fluid pressure.

When the oil grade is determined, the controller 126 may then deliver the oil grade information to other internal or external programs that use the information for fuel system control strategies. Additionally, the oil grade information may be used to determine and control operational characteristics of the fuel system, including the desired fuel quantity, desired pressure of the actuating fluid, desired injection electrical duration, start of fuel delivery, and desired injection timing. For example, the fuel injector on-time or a solenoid duration enables actuating fluid to flow to the injectors may be modified to ensure the proper amount of fuel is injected, and the desired injection timing is realized.

INDUSTRIAL APPLICABILITY

The present invention provides a method and apparatus for determining an oil grade of an actuating fluid in a hydraulic-electronic fuel system. The method includes the steps of determining a temperature of the actuating fluid, pump speed, peak pressure, timing event, and responsively determining the oil grade of the actuating fluid.

The oil grade of the actuating fluid effects both when fuel is delivered (the injection timing) and amount of fuel delivered by the injector. For example, an actuating fluid having a high oil grade is thicker, i.e., has a higher viscosity, than an actuating fluid having a lower oil grade. Therefore, when an electrical signal is delivered to a solenoid controlling a fuel injector, commanding the solenoid to enable the delivery of actuating fluid to the injector the fluid flows at a slower rate. The actuating fluid flows into a chamber within the fuel injector and pushes down on a plunger enabling fuel to pass out the injector nozzle. With the actuating fluid moving at a slower rate there is an increased delay before the injector begins delivering fuel. Furthermore, when the solenoid is again turned off to stop delivery of the fuel the reduced flow rate of the actuating fluid results in less total fuel being injected between when the solenoid is turned on and off. When an inaccurate amount of fuel is delivered by the injectors or the timing of the injection delivery shifts, overall engine performance is adversely effected.

During the cranking of an engine, the injectors are initially de-energized, preventing fuel from being injected. The actuating fluid is circulated from the pump 106 as it moves from maximum displacement to minimum displacement, through a pressure control valve 112, a fluid sump 110, and back to the pump 106. The fluid temperature, and the pump speed or fluid pressure are sensed, and signals are respectively delivered to a controller 126. In the preferred embodiment the actuating fluid is petroleum based oil. The controller 126 determines the oil grade of the fluid based upon the fluid temperature, pump speed, timing event, or peak pressure of the fluid.

When the controller 126 determines the oil grade of the actuating fluid, the information may be delivered to a control strategy to determine and control the operational characteristics of the fuel system including the desired fuel quantity, desired injection duration, desired injection timing, and desired fluid pressure, thereby improving the overall performance of the fuel system.

In addition, when the controller 126 determines the oil grade of the actuating fluid most closely resembles, the injectors 104 are then enabled for firing via the electrical solenoids (not shown).

Other aspects, objects, and advantages of the present invention can be obtained from a study of the drawings, the disclosure, and the claims.

What is claimed is:

1. A method for determining an oil grade of an actuating fluid located within a fuel system, and the fuel system including a variable displacement pump, comprising the steps of:

determining a temperature of the actuating fluid;

determining a pump speed;

determining a peak pressure of the actuating fluid;

determining a timing event associated with the peak pressure of the actuating fluid; and, determining an oil grade of the actuating fluid in response to the temperature of the actuating fluid, the pump speed, and the timing event associated with the peak pressure.

2. A method, as set forth in claim 1, wherein the step of determining a timing event associated with the peak pressure further comprises the step of determining when the peak pressure was attained.

3. A method, as set forth in claim 1, wherein the step of determining a timing event associated with the peak pressure further comprises the step of determining a decay time for the peak pressure.

4. A method, as set forth in claim 1, wherein the step of determining the oil grade further comprises the steps of:

comparing the temperature of the actuating fluid, the pump speed, the peak pressure, and the timing event with at least one of a plurality of timing event maps; and, determining the oil grade in response to the comparison.

5. A method, as set forth in claim 1, including the step of determining the timing event in response to the variable displacement pump moving from a maximum displacement position to a minimum displacement position.

6. A method, as set forth in claim 1, wherein the step of determining the peak pressure further comprising the step of cranking the engine while determining the peak pressure.

7. A method for determining an oil grade of an actuating fluid located within a fuel system, and the fuel system including a variable displacement pump having a maximum displacement position and a minimum displacement position, comprising the steps of:

determining a temperature of the actuating fluid;

determining a pump speed;

determining when the displacement moves from a maximum displacement position to a minimum displacement position;

determining when a peak pressure of the actuating fluid is attained;

determining a rise time of the peak pressure in response to the pump moving from the maximum displacement position to the minimum displacement position; and determining an oil grade of the actuating fluid in response to the temperature of the actuating fluid, the pump speed, the peak pressure, and the rise time of the peak pressure.

8. A method, as set forth in claim 7, wherein the step of determining the oil grade further comprises the steps of:

comparing the temperature of the actuating fluid, the pump speed, the peak pressure, and the rise time of the peak pressure with at least one of a plurality of oil grade maps; and, determining said oil grade in response to the comparison.

9. A method, as set forth in claim 7, wherein the step of determining the peak pressure further comprising the step of cranking the engine while determining the rise time of the peak pressure.

10. A method for determining an oil grade of an actuating fluid located within a fuel system, and the fuel system having a leakage orifice, comprising the steps of:

determining a temperature of the actuating fluid;

determining a pump speed;

determining a peak pressure of the actuating fluid;

determining a decay time of the peak pressure as a function of the peak pressure and the leakage orifice; and determining an oil grade of the actuating fluid in response to the temperature of the actuating fluid, the pump speed, the peak pressure, and the decay time of the peak pressure.

11. A method, as set forth in claim 10, wherein the step of determining the oil grade further comprises the steps of:

comparing the temperature of the actuating fluid, the pump speed, the peak pressure, and the decay time of the peak pressure with at least one of a plurality of oil grade maps; and, determining said oil grade in response to the comparison.

12. An apparatus for determining an oil grade of an actuating fluid located within a fuel system, and the fuel system including a pump, comprising:

a temperature sensor adapted to sense a temperature of the actuating fluid, and responsively produce a temperature signal;

a pump speed sensor adapted to sense a pump speed, and responsively produce a pump speed signal;

a pressure sensor adapted to sense a pressure of the actuating fluid, and responsively produce a pressure signal; and, a controller adapted to receive the temperature signal, the pump speed signal and the pressure signal, and responsively calculate a peak pressure and a timing event associated with the peak pressure and determine an oil grade of the actuating fluid as a function of the temperature signal, the pump speed signal and the timing event associated with the peak pressure.

13. An apparatus, as set forth in claim 12, wherein said pump is a variable displacement pump wherein the pump speed sensor is adapted to sense the pump speed as the pump moves from a maximum displacement position to a minimum displacement position.

14. An apparatus, as set forth in claim 12, wherein said controller further comprises:

at least one of a plurality of predetermined oil grade maps as a function of the actuating fluid temperature and the pump speed, the oil grade being determined in response to said at least one predetermined oil grade maps.

* * * * *

UNITED STATES PATENT AND TRADEMARK OFFICE

CERTIFICATE OF CORRECTION

PATENT NO. : 6,415,652 B1
DATED : July 9, 2002
INVENTOR(S) : Darwin R. Carrell et al.

It is certified that error appears in the above-identified patent and that said Letters Patent is hereby corrected as shown below:

Column 4,
Line 40, remove "312" and replace with -- 310 --.

Signed and Sealed this

Twenty-ninth Day of October, 2002

*Attest:*

JAMES E. ROGAN

*Attesting Officer*

*Director of the United States Patent and Trademark Office*